US011973648B2

(12) United States Patent
Mahishi et al.

(10) Patent No.: US 11,973,648 B2
(45) Date of Patent: Apr. 30, 2024

(54) AUTOMATIC DEACTIVATION AND ACTIVATION OF CONFIGURATION FUNCTIONALITIES OF A NETWORK DEVICE THAT ARE INCOMPATIBLE WITH PERFORMANCE OF AN IN-SERVICE SOFTWARE UPGRADE PROCEDURE

(71) Applicant: Juniper Networks, Inc., Sunnyvale, CA (US)

(72) Inventors: Shrish Mahishi, Bangalore (IN); Prashant M Iliger, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/653,570

(22) Filed: Mar. 4, 2022

(65) Prior Publication Data

US 2023/0283518 A1 Sep. 7, 2023

(51) Int. Cl.
*H04L 41/082* (2022.01)
*H04L 41/08* (2022.01)
*H04L 41/0859* (2022.01)
*H04L 41/0873* (2022.01)

(52) U.S. Cl.
CPC ........ *H04L 41/0873* (2013.01); *H04L 41/082* (2013.01); *H04L 41/0859* (2013.01); *H04L 41/0883* (2013.01)

(58) Field of Classification Search
CPC ............... H04L 41/0873; H04L 41/082; H04L 41/0859; H04L 41/0883
See application file for complete search history.

(56) References Cited

U.S. PATENT DOCUMENTS 10,083,026 B1 * 9/2018 Venkata ................ H04L 41/082
10,103,995 B1 * 10/2018 Baveja ................... H04L 63/101
10,534,601 B1 * 1/2020 Venkata ..................... G06F 8/65
(Continued)

OTHER PUBLICATIONS

European Telecommunications Standards Institute (ETSI)., "Integrated Broadband Cable Telecommunication Networks (CABLE); Cable Network Transition to IPv6 Part 1: IPv6 Transition Requirements," Jun. 9, 2013, pp. 1-220, XP014196737, [retrieved on Jun. 9, 2013].

(Continued)

*Primary Examiner* — Ario Etienne
*Assistant Examiner* — Kidest Mendaye
(74) *Attorney, Agent, or Firm* — Harrity & Harrity, LLP

(57) ABSTRACT

A network device may be configured to identify a first configuration data structure included in the network device and may be configured to obtain a data package associated with an ISSU procedure that includes a second configuration data structure. The network device may be configured to identify, based on the first configuration data structure and the second configuration data structure, one or more configuration functionalities of the network device that are to not be active during performance of the ISSU procedure. The network device may be configured to cause the one or more configuration functionalities of the network device to be deactivated and to thereafter cause the ISSU procedure to be performed. The network device may be configured to cause, after causing the ISSU procedure to be performed, the one or more configuration functionalities of the network device to be activated.

20 Claims, 11 Drawing Sheets

(56) References Cited

U.S. PATENT DOCUMENTS

| | | | |
|---|---|---|---|
| 2014/0105068 A1* | 4/2014 | Xu | H04L 67/34 370/255 |
| 2014/0304698 A1* | 10/2014 | Chigurapati | H04L 41/082 717/171 |
| 2015/0186206 A1 | 7/2015 | Bhattacharya et al. | |
| 2020/0310784 A1* | 10/2020 | Krishnan | H04L 69/164 |

OTHER PUBLICATIONS

Extended European Search Report for Application No. EP22165161.5, dated Aug. 31, 2022, 14 pages.

\* cited by examiner

（1）

AUTOMATIC DEACTIVATION AND ACTIVATION OF CONFIGURATION FUNCTIONALITIES OF A NETWORK DEVICE THAT ARE INCOMPATIBLE WITH PERFORMANCE OF AN IN-SERVICE SOFTWARE UPGRADE PROCEDURE

BACKGROUND

An in-service software upgrade (ISSU) procedure is a technique for updating software on a network device without taking the network device offline. In this way, the network device can be updated while minimizing disruption to traffic and control plane services provided by the network device.

SUMMARY

Some implementations described herein relate to a network device. The network device may include one or more memories and one or more processors. The network device may be configured to identify a first configuration data structure included in the network device. The network device may be configured to obtain a data package associated with an ISSU procedure that includes a second configuration data structure. The network device may be configured to identify, based on the first configuration data structure and the second configuration data structure, one or more configuration functionalities of the network device that are to not be active during performance of the ISSU procedure. The network device may be configured to cause the one or more configuration functionalities of the network device to be deactivated. The network device may be configured to cause, after causing the one or more configuration functionalities of the network device to be deactivated and based on the data package, the ISSU procedure to be performed. The network device may be configured to cause, after causing the ISSU procedure to be performed, the one or more configuration functionalities of the network device to be activated.

Some implementations described herein relate to a non-transitory computer-readable medium that stores a set of instructions for a network device. The set of instructions, when executed by one or more processors of the network device, may cause the network device to obtain a data package associated with an in an ISSU procedure. The set of instructions, when executed by one or more processors of the network device, may cause the network device to identify, based on obtaining the data package, one or more configuration functionalities of the network device that are to not be active during performance of the ISSU procedure. The set of instructions, when executed by one or more processors of the network device, may cause the network device to cause the one or more configuration functionalities of the network device to be deactivated. The set of instructions, when executed by one or more processors of the network device, may cause the network device to cause, after causing the one or more configuration functionalities of the network device to be deactivated and based on the data package, the ISSU procedure to be performed.

Some implementations described herein relate to a method. The method may include identifying, by a network device, one or more configuration functionalities of the network device that are to not be active during performance of an ISSU procedure. The method may include causing, by the network device, the one or more configuration functionalities of the network device to be deactivated. The method may include causing, by the network device and after causing the one or more configuration functionalities of the network device to be deactivated, the ISSU procedure to be performed.

DETAILED DESCRIPTION

Figure 1A:
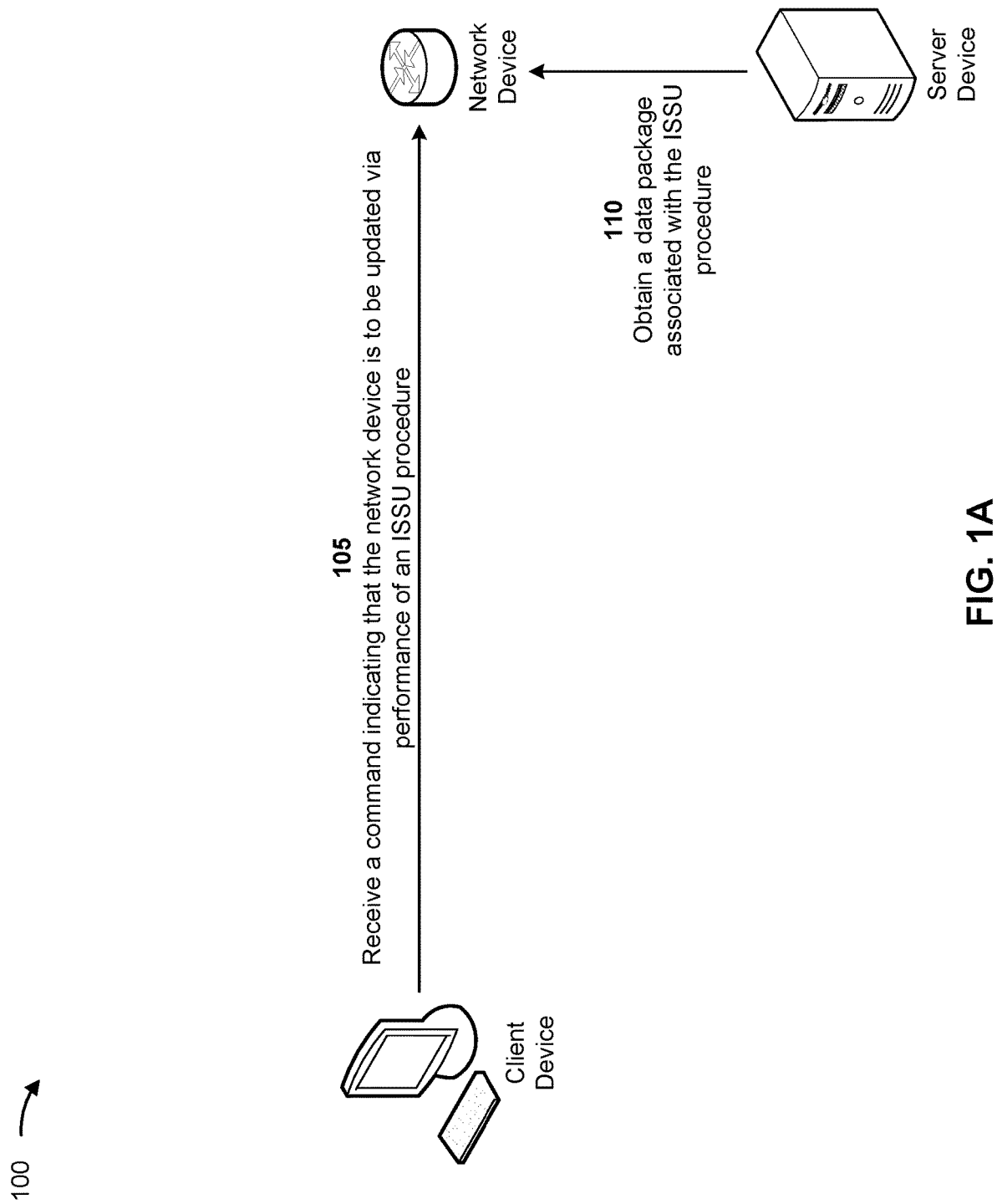
FIGS. 1A-1G are diagrams of an example implementation described herein.

The following detailed description of example implementations refers to the accompanying drawings. The same reference numbers in different drawings may identify the same or similar elements.

A network device includes configuration functionalities (e.g., features, processes, applications, or services, among other examples) that the network device utilizes to facilitate routing of traffic through the network. When the network device is to be upgraded, the network device may perform an in-service software upgrade (ISSU) procedure to update the network device (e.g., without taking the network device offline). However, in some cases, some of the configuration functionalities are not compatible with performance of the ISSU procedure. Accordingly, performance of the ISSU procedure may detrimentally impact an operational performance of these configuration functionalities. For example, performance of the ISSU procedure may cause a configuration functionality to misbehave (e.g., cause unexpected errors) or to stop executing. This results in using computing resources (e.g., processing resources, memory resources, communication resources, and/or power resources, among other examples) of the network device and/or one or more other devices to attempt to fix the configuration functionality and/or to address any issues (e.g., misrouting issues, blackholing issues, or other issues) associated with the impacted operational performance of the configuration functionality.

In some cases, an administrator of the network device may run customized scripts to deactivate incompatible configuration functionalities prior to performance of the ISSU procedure on the network device and may run other customized scripts to activate the incompatible configuration functionalities after performance of the ISSU procedure. However, in many cases, such as due to continually changing configurations of the network device, the scripts do not deactivate and/or activate all of the incompatible configuration functionalities, which results in similar performance issues to those described above for the incompatible configuration functionalities not addressed by the scripts. In other cases, the scripts needlessly deactivate and/or activate configuration functionalities that are compatible with the ISSU procedure, which results in unnecessary operational performance issues of these configuration functionalities (e.g., due to the configuration functionalities not being active during performance of the ISSU procedure).

Some implementations described herein provide a network device that includes a first configuration data structure. The network device obtains a data package associated with an ISSU procedure (e.g., that the network device is to execute to cause performance of the IS SU procedure to update the network device). The data package includes a second configuration data structure. In some implementations, the first configuration data structure and the second configuration data structure identify one or more configuration functionalities of the network device that are incompatible with performance of the ISSU procedure, and the network device processes (e.g., parses) the first configuration data structure and the second data structure to identify the one or more configuration functionalities of the network device that are to not be active during performance of the ISSU procedure. Accordingly, the network device causes the one or more configuration functionalities of the network device to be deactivated, and thereby causes the ISSU procedure to be performed (e.g., based on the data package). After causing the ISSU procedure to be performed, the network device causes the one or more configuration functionalities to be activated.

In this way, the network device automatically deactivates and activates the one or more configuration functionalities of the network device that are incompatible with performance of the ISSU procedure. The network device therefore causes the ISSU procedure to be performed when the one or more configuration functionalities are deactivated and causes the one or more configuration functionalities to be activated after the ISSU procedure has been performed. This enables the network device to be updated (e.g., based on performance of the ISSU procedure) without detrimentally impacting a performance of the one or more configuration functionalities of the network device (e.g., because the one or more configuration functionalities were not active during performance of the ISSU procedure). Accordingly, a likelihood that the one or more configuration functionalities misbehave (e.g. cause unexpected errors) or stop executing is reduced, which minimizes a use of computing resources (e.g., processing resources, memory resources, communication resources, and/or power resources, among other examples) of the network device and/or one or more other devices to attempt to fix the one or more configuration functionalities and/or to address any issues (e.g., misrouting issues, blackholing issues, or other issues) associated with an impacted performance of the one or more configuration functionalities. Further, some implementations eliminate a need for an administrator to generate and run customized scripts associated with performance of the IS SU procedure, which further reduces a likelihood of performance issues resulting from incompatible configuration functionalities not being correctly deactivated and activated for performance of the ISSU procedure and/or compatible configuration functionalities being unnecessarily deactivated and/or activated for performance of the ISSU procedure.

FIGS. 1A-1G are diagrams of one or more example implementations 100 described herein. Example implementation(s) 100 may include a network device, a client device, and/or a server device, which are described in more detail below in connection with FIGS. 2-4. The one or more network devices and/or the monitoring device may be configured to communicate with each other via a network.

The network device may include a plurality of configuration functionalities (e.g., a plurality of features, processes, applications, or services, among other examples) that the network device provides to facilitate routing of traffic through the network. In some implementations, one or more configuration functionalities, of the plurality of configuration functionalities, are incompatible with performance of an ISSU procedure (e.g., by the network device). For example, performing the ISSU procedure while the one or more configuration functionalities are active on the network device may detrimentally impact a performance of the one or more configuration functionalities during performance of the ISSU procedure and/or after performance of the ISSU procedure. Some implementations described herein enable the network device to automatically deactivate and/or activate the one or more configuration functionalities as part of performance of an IS SU procedure.

As shown in FIG. 1A, and by reference number 105, the network device may receive a command, such as from the client device. For example, a user of the client device may interact with a user interface provided by the network device (e.g., a command line interface (CLI), a graphical user interface (GUI), or another interface) to enter the command, and the client device may send the command to the network device. The command may indicate that the network device is to be updated via performance of an ISSU procedure. For example, the command may include an instruction to communicate with the server device to obtain a data package that is associated with the ISSU procedure (e.g., a software installation package that includes an updated network device image and/or other upgrade information associated with the ISSU procedure) and to cause the ISSU procedure to be performed (e.g., based on the data package). The command may indicate that the network device has permission to deactivate and/or activate configuration functionalities of the network device (e.g., to facilitate performance of the ISSU procedure). For example, the command may include an indication (e.g., a command line option, such as indicated by a string prefixed by a dash ("-") when the command is entered via the CLI) that the network device has permission to deactivate and/or activate configuration functionalities of the network device to facilitate performance of the ISSU procedure.

As shown by reference number 110, the network device may obtain the data package from the server device (e.g., based on the command received from the client device). For example, the network device may send (e.g., based on the command) a request (e.g., for the data package that is associated with the ISSU procedure) to the server device, and the server device may send (e.g., based on the request) the data package to the network device. Accordingly, the network device may receive the data package and may therefore perform one or more additional steps related to performance of the ISSU procedure, as described herein.

Figure 1B:
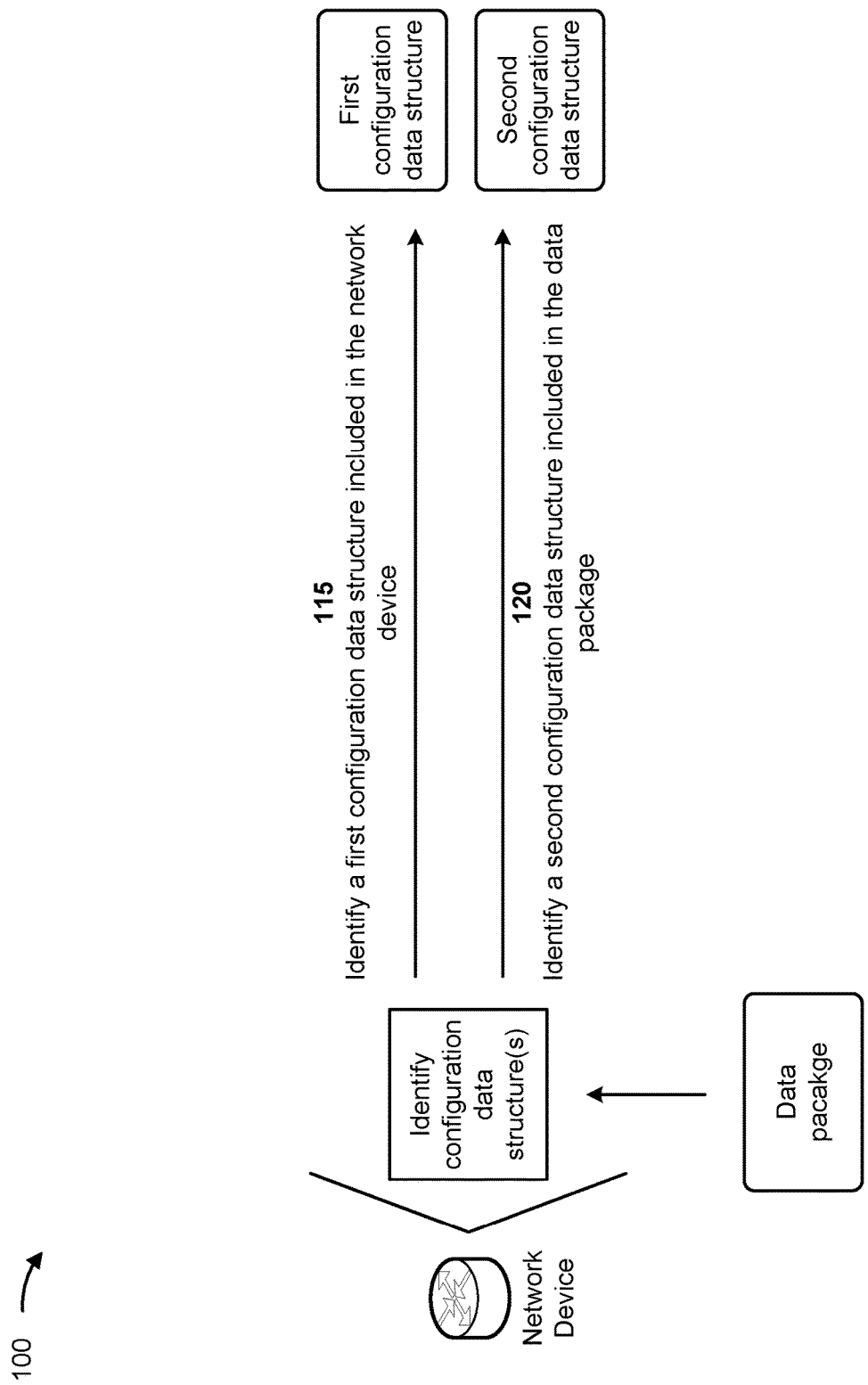

As shown in FIG. 1B, the network device may identify one or more configuration data structures (e.g., databases, electronic files, or other data structures) associated with the network device. For example, as shown by reference number 115, the network device may identify a first configuration data structure included in the network device (e.g., that is stored and/or maintained by the network device). As another example, as shown by reference number 120, the network device may identify a second configuration data structure included in the data package. The network device may process (e.g., parse) the data package to identify the second configuration data structure. At least one of the first configuration data structure or the second configuration data structure may indicate, for a particular configuration functionality, of the one or more configuration functionalities of the network device, that the particular configuration functionality is to not be active during performance of the ISSU procedure. For example, the first configuration data structure may indicate one or more configuration functionalities of the network device that are to not be active during performance of a general ISSU procedure, and the second configuration data structure may indicate one or more configuration functionalities of the network device that are to not be active during performance of the specific ISSU procedure associated with the data package (e.g., the first configuration data structure and the second configuration data structure may identify some or all of the same configuration functionalities and/or different configuration functionalities).

Figure 1C:
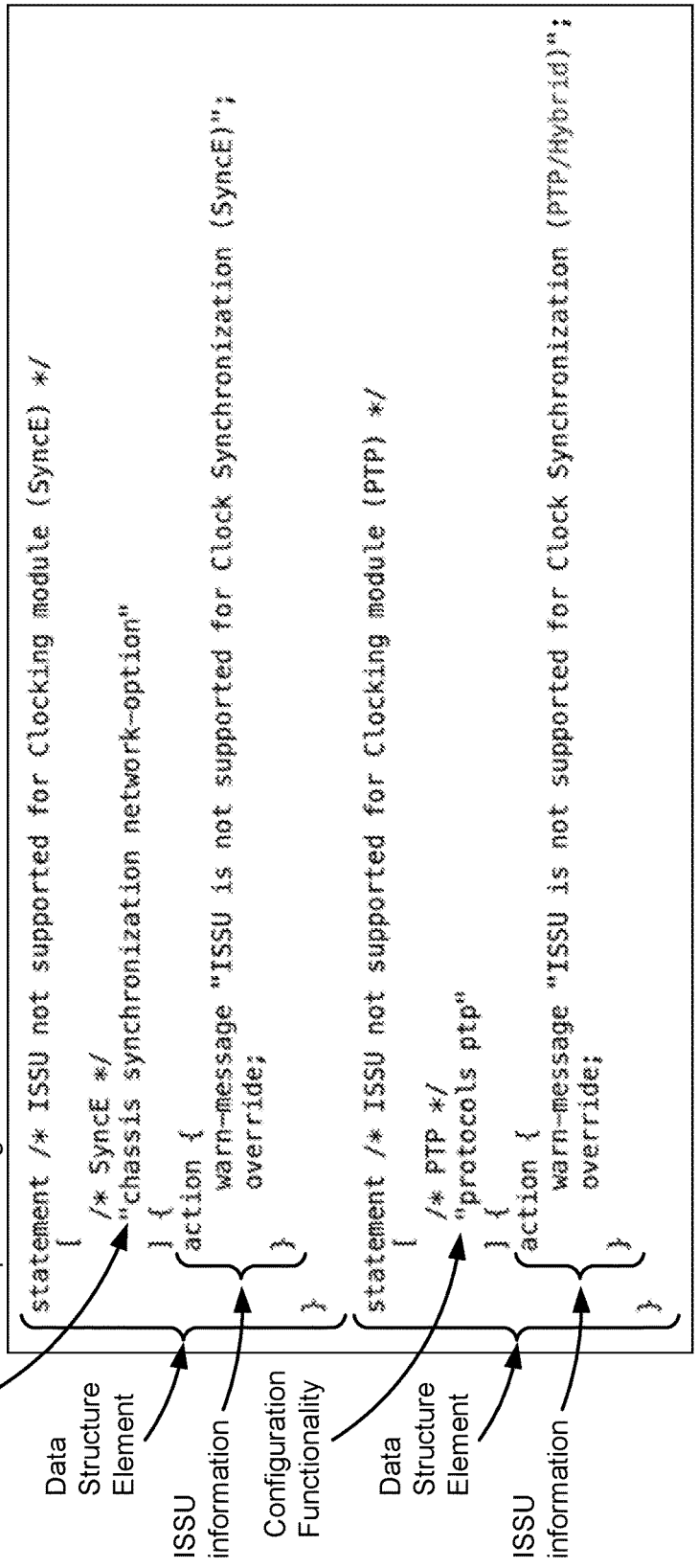

As shown in FIG. 1C, a configuration data structure (e.g., at least one of the first configuration data structure or the second configuration data structure) may include one or more data structure elements. Each data structure element may identify a configuration functionality of the one or more configuration functionalities of the network device that are incompatible with performance of the ISSU procedure. Moreover, the data structure element may indicate that the configuration functionality is not compatible with the ISSU procedure and/or that the configuration functionality is to not be active during performance of the ISSU procedure. For example, as shown in FIG. 1C, a first data structure identifies a first configuration functionality (e.g., a "chassis synchronization network-option" configuration functionality) and includes ISSU information (e.g., indicated by an "action" label) that indicates that (1) the first configuration functionality is not compatible with the ISSU procedure (e.g., via a "warn-message" label, "ISSU is not supported for Clock Synchronization (SyncE)") and that (2) the first configuration functionality is to not be active during performance of the ISSU procedure (e.g., via an "override" label). As another example, as further shown in FIG. 1C, a second data structure identifies a second configuration functionality (e.g., a "protocols ptp" configuration functionality) and includes ISSU information (e.g., indicated by an "action" label) that indicates that (1) the second configuration functionality is not compatible with the IS SU procedure (e.g., via a "warn-message" label, "ISSU is not supported for Clock Synchronization (PTP/Hybrid)") and that (2) the second configuration functionality is to not be active during performance of the ISSU procedure (e.g., via an "override" label).

Figure 1D:
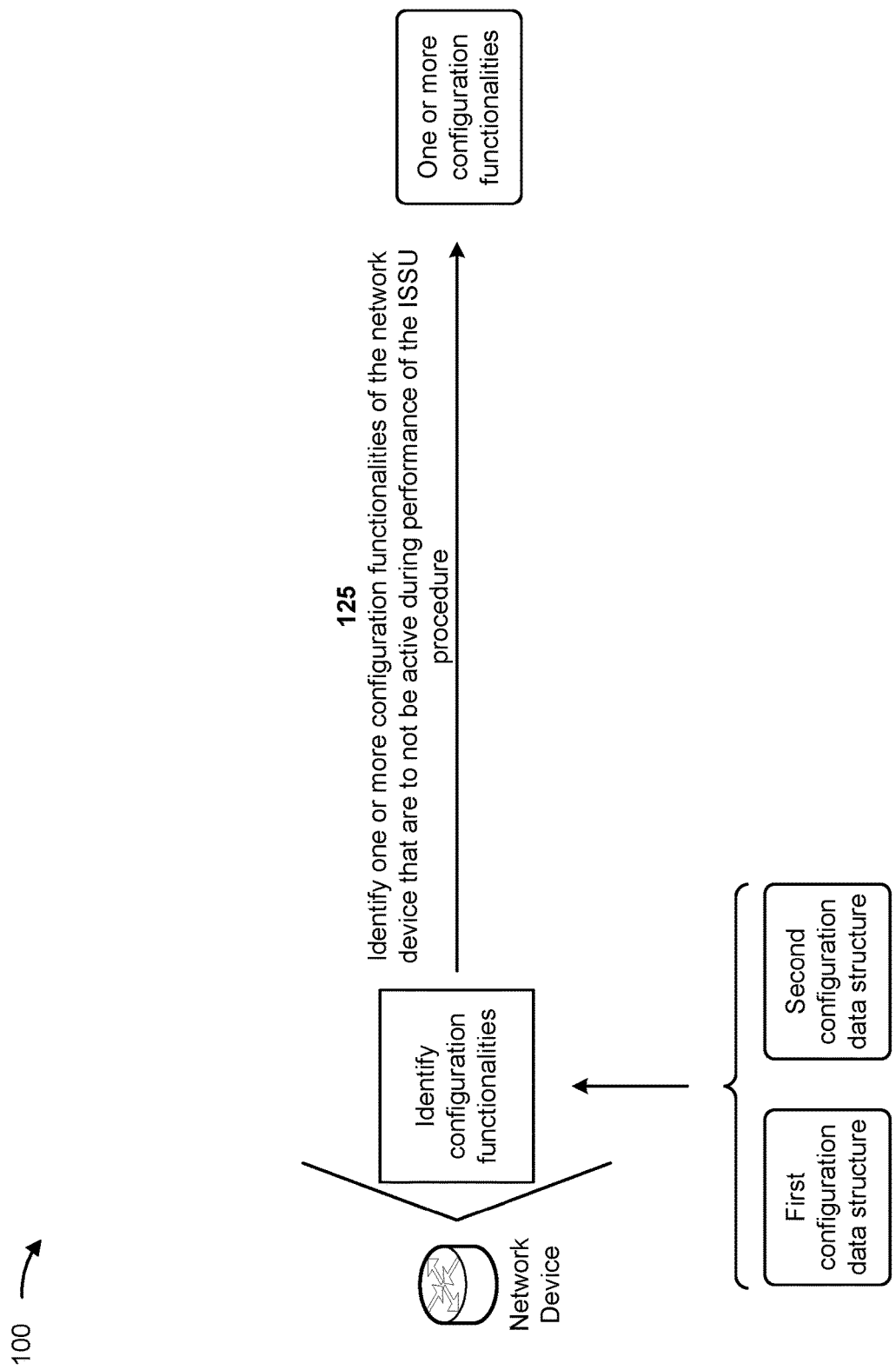

As shown in FIG. 1D, and by reference number 125, the network device may identify the one or more configuration functionalities of the network device that are to not be active during performance of the IS SU procedure. For example, the network device may process (e.g., search, such as by using a processing tool configured to search configuration data structures) the first configuration data structure and/or the second configuration data structure to identify one or more data structure elements, and may process (e.g., parse, such as by using the process tool) the one or more data structure elements to identify the one or more configuration functionalities of the network device (e.g., that are identified by the one or more data structure elements). In some implementations, when the first configuration data structure and the second configuration data structure identify a same configuration functionality (and both indicate that the configuration functionality is to not be active during performance of the ISSU procedure), the network device may include the configuration functionality in the one or more configuration functionalities of the network device that are to not be active during performance of the ISSU procedure. In some implementations, when the first configuration data structure and the second configuration data structure identify a same configuration functionality (but do not both indicate that the configuration functionality is to not be active during performance of the ISSU procedure), the network device may compare a first data structure element of the first configuration data structure and a second data structure element of the second configuration data structure that both identify the configuration functionality. The network device may thereby select, based on the comparison and from the first data structure element and the second data structure element, a particular data structure element (e.g., select a particular data structure element that has a higher priority, a more recent modification date, or another more preferential characteristic or parameter than the other data structure element). Accordingly, when the selected data structure element indicates that the configuration functionality is to not be active during performance of the ISSU procedure, the network device may include the configuration functionality in the one or more configuration functionalities of the network device that are to not be active during performance of the IS SU procedure.

Additionally, or alternatively, when the first configuration data structure identifies a configuration functionality that is not identified by the second configuration data structure, the network device may not include the configuration functionality in the one or more configuration functionalities of the network device that are to not be active during performance of the ISSU procedure (e.g., when the first configuration data structure indicates that the configuration functionality is to not be active during performance of the ISSU procedure). Additionally, or alternatively, when the second configuration data structure identifies a configuration functionality that is not identified by the first configuration data structure, the network device may include the configuration functionality in the one or more configuration functionalities of the network device that are to not be active during performance of the ISSU procedure (e.g., when the second configuration data structure indicates that the configuration functionality is to not be active during performance of the ISSU procedure). Some additional implementations contemplate other processes for identifying the one or more configuration functionalities of the network device that are to not be active during performance of the ISSU procedure (e.g., based on the first configuration data structure and/or the second configuration data structure, or not based on the first configuration data structure and the second configuration data structure).

In some implementations, the network device may store information identifying the one or more configuration functionalities of the network device in another data structure (e.g., a database, an electronic file, or another data structure) that is distinct from the first configuration data structure and the second configuration data structure. This may facilitate one or more processing steps associated with deactivating and/or activating the one or more configuration functionalities of the network device, as further described herein (e.g., because the network device does not need to reprocess the first configuration data structure and/or the second configuration data structure to identify the one or more configuration functionalities of the network device).

Figure 1E:
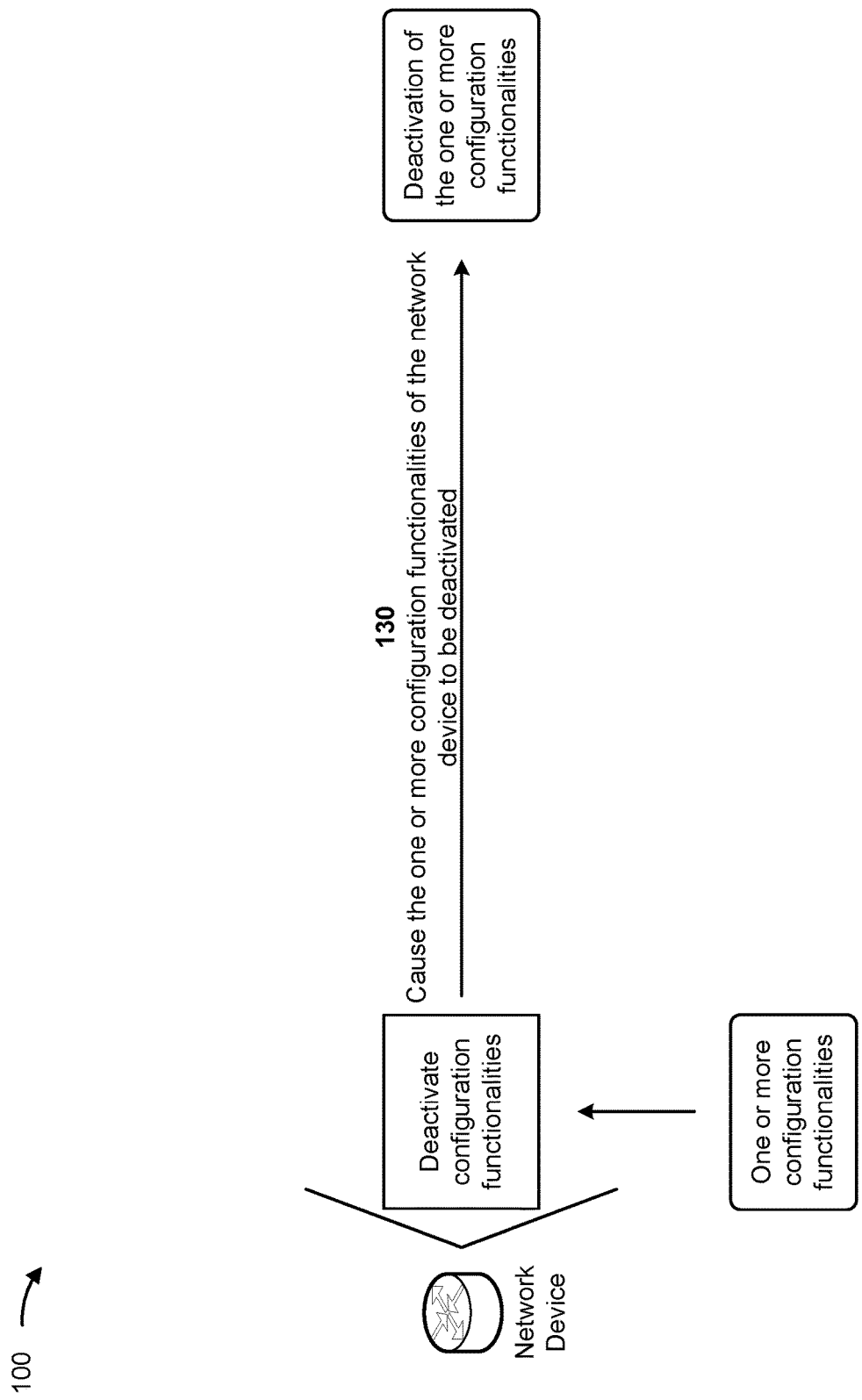

As shown in FIG. 1E, and by reference number 130, the network device may cause the one or more configuration functionalities of the network device to be deactivated. For example, the network device may cause one or more deactivation actions associated with the one or more configuration functionalities of the network device to be performed. The one or more deactivation actions may include, for example, the network device generating one or more commands to deactivate the one or more configuration functionalities and executing the one or more commands (e.g., causing the one or more commands to be executed by the network device). In some implementations, the network device may obtain the information identifying the one or more configuration functionalities of the network device from the other data structure and may cause, based on the information, the one or more configuration functionalities of the network device to be deactivated.

Figure 1F:
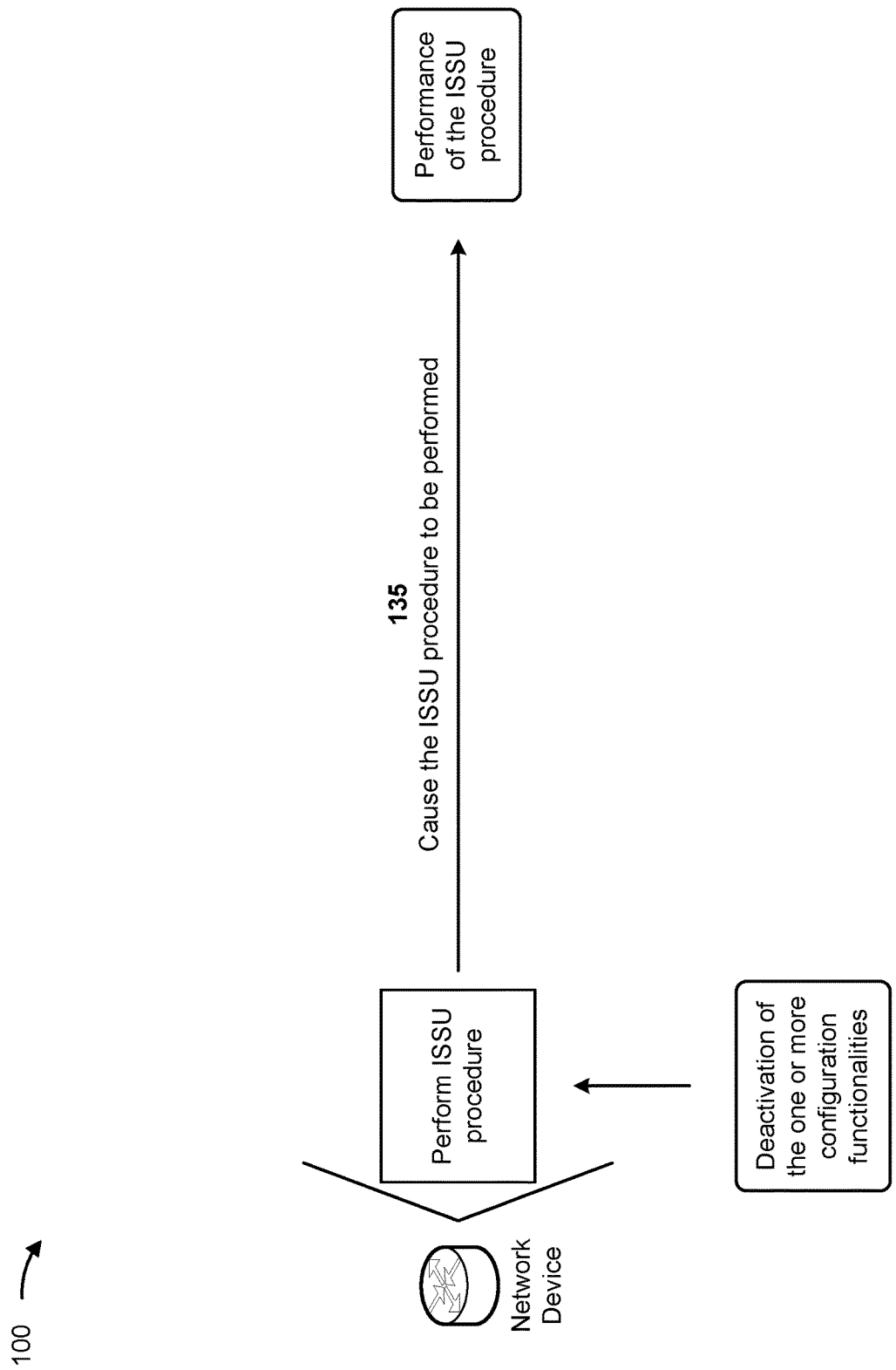

As shown in FIG. 1F, and by reference number 135, the network device may cause the ISSU procedure to be performed (e.g., after causing the one or more configuration functionalities of the network device to be deactivated). The network device may cause the ISSU procedure to be performed based on the data package (e.g., that the network device received from the server device). For example, the network device may process (e.g., execute) the data package to cause the network device to perform the ISSU procedure. In this way, the network device may cause one or more parameters (e.g., one or more settings) of at least one other configuration functionality of the network device (e.g., that is not included in the one or more configuration functionalities of the network device that are incompatible with performance of the ISSU procedure) to be modified (e.g., cause the one or more parameters to be updated based on performance of the IS SU procedure).

Figure 1G:
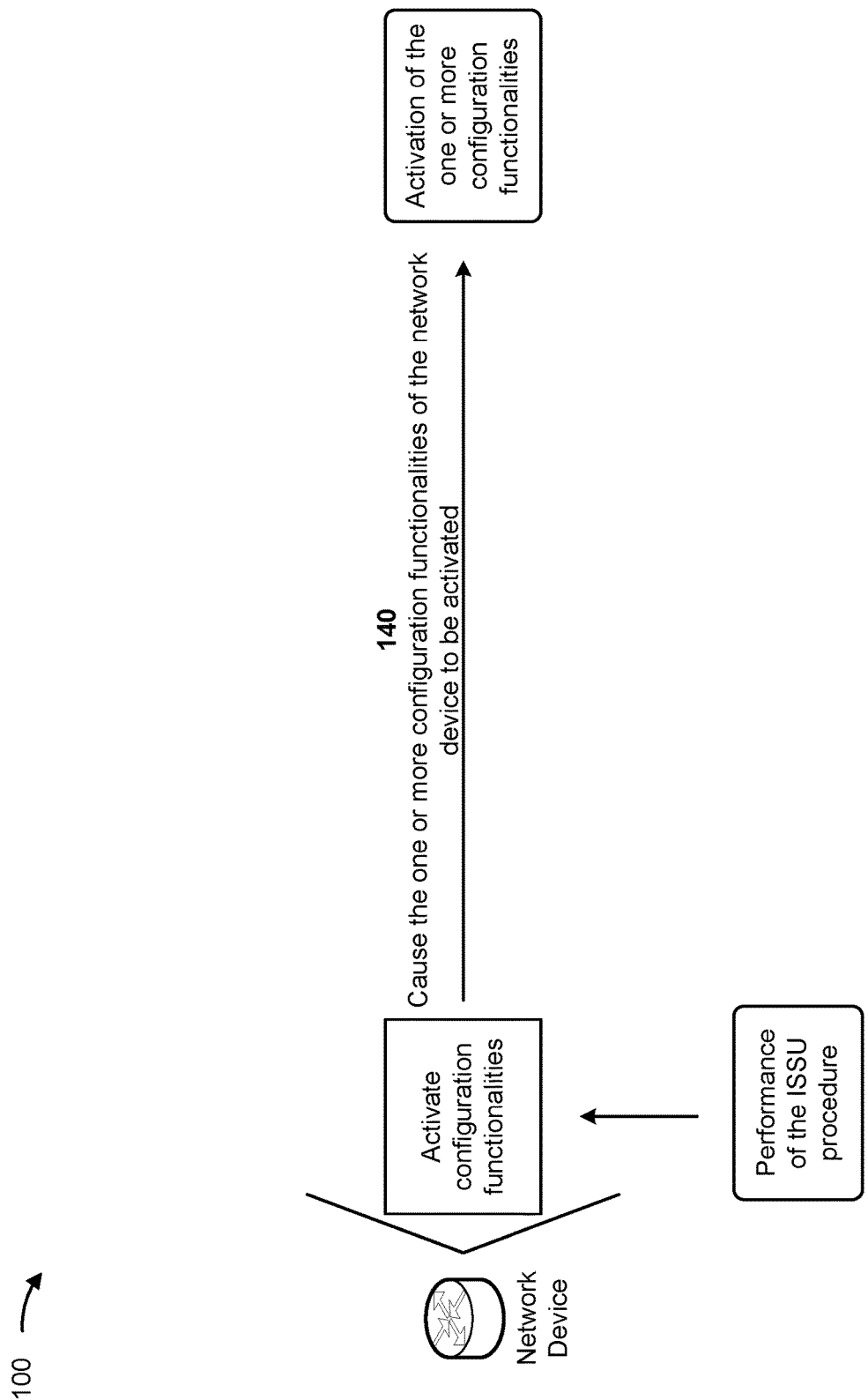

As shown in FIG. 1G, and by reference number 140, the network device may cause the one or more configuration functionalities of the network device to be activated (e.g., after causing the ISSU procedure to be performed). For example, the network device may cause one or more activation actions associated with the one or more configuration functionalities of the network device to be performed. The one or more deactivation actions may include, for example, the network device generating one or more commands to activate the one or more configuration functionalities and executing the one or more commands (e.g., causing the one or more commands to be executed by the network device). In some implementations, the network device may obtain the information identifying the one or more configuration functionalities of the network device from the other data structure and may cause, based on the information, the one or more configuration functionalities of the network device to be activated.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G. For example, a network device, of the one or more network devices, may perform one or more functions described as being performed by the monitoring device, or vice versa.

Figure 2:
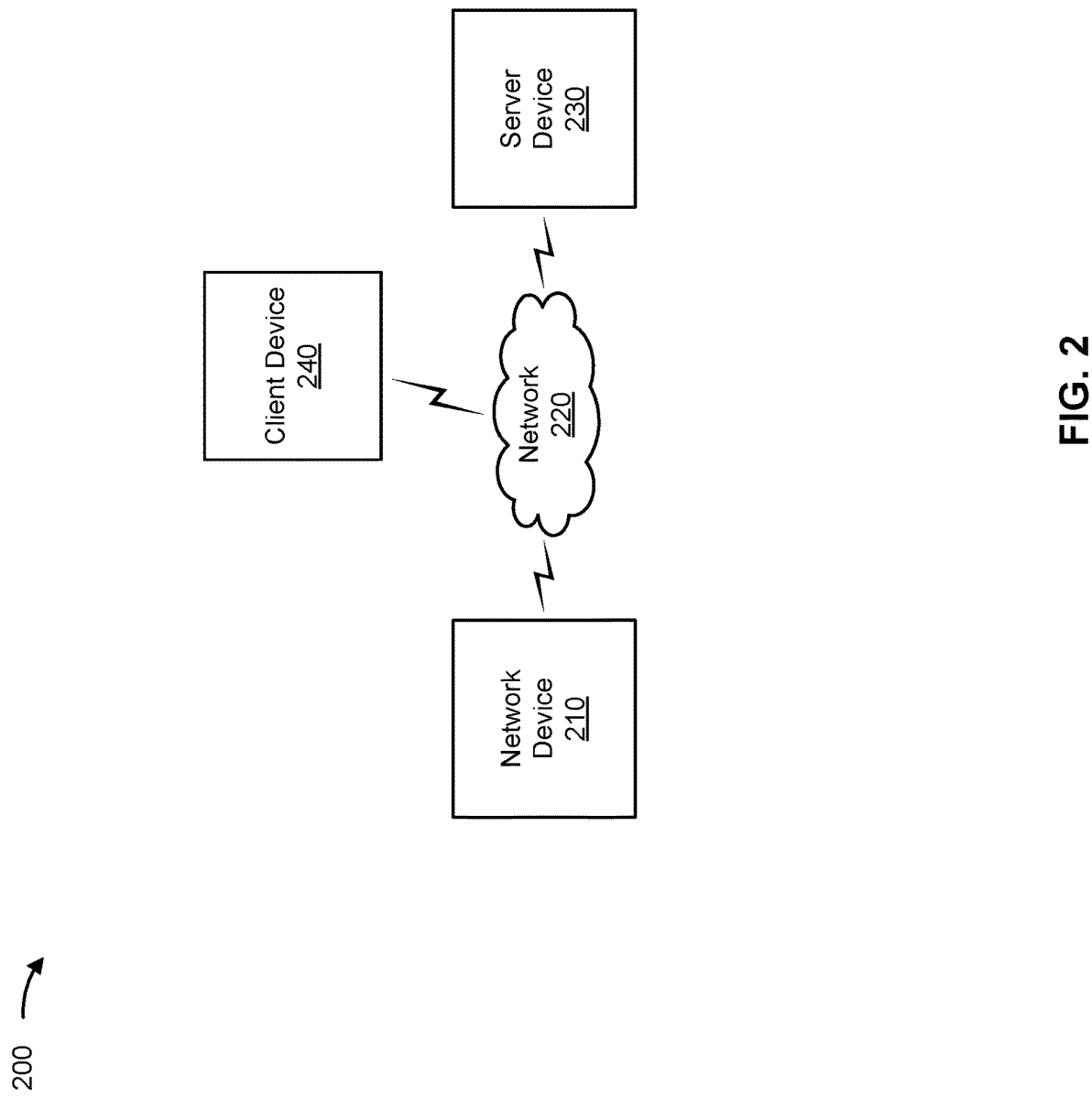
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network device 210, a network 220, a server device 230, and/or a client device 240. Devices and/or elements of environment 200 may interconnect via wired connections and/or wireless connections.

Network device 210 includes one or more devices capable of receiving, processing, storing, routing, and/or providing information related to automatic deactivation and activation of configuration functionalities of the network device 210 that are incompatible with performance of an ISSU procedure, as described elsewhere herein. For example, network device 210 may include a router, such as a label switching router (LSR), a label edge router (LER), an ingress router, an egress router, a provider router (e.g., a provider edge router or a provider core router), a virtual router, or another type of router. Additionally, or alternatively, network device 210 may include a gateway, a switch, a firewall, a hub, a bridge, a reverse proxy, a server (e.g., a proxy server, a cloud server, or a data center server), a load balancer, and/or a similar device. In some implementations, network device 210 may be a physical device implemented within a housing, such as a chassis. In some implementations, network device 210 may be a virtual device implemented by one or more computer devices of a cloud computing environment or a data center. In some implementations, a group of network devices 210 may be a group of data center nodes that are used to route traffic flow through network 220.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

Server device 230 includes one or more devices capable of receiving, generating, storing, processing, providing, and/or routing information related to a data package associated with an ISSU procedure, as described elsewhere herein. Server device 230 may include a communication device and/or a computing device. For example, server device 230 may include a server, such as an application server, a client server, a web server, a database server, a host server, a proxy server, a virtual server (e.g., executing on computing hardware), or a server in a cloud computing system. In some implementations, server device 230 includes computing hardware used in a cloud computing environment.

Client device 240 includes one or more devices capable of receiving, generating, storing, processing, and/or providing information associated with providing a command indicating that the network device 210 is to be updated via performance of an ISSU procedure, as described elsewhere herein. Client device 240 may include a communication device and/or a computing device. For example, client device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
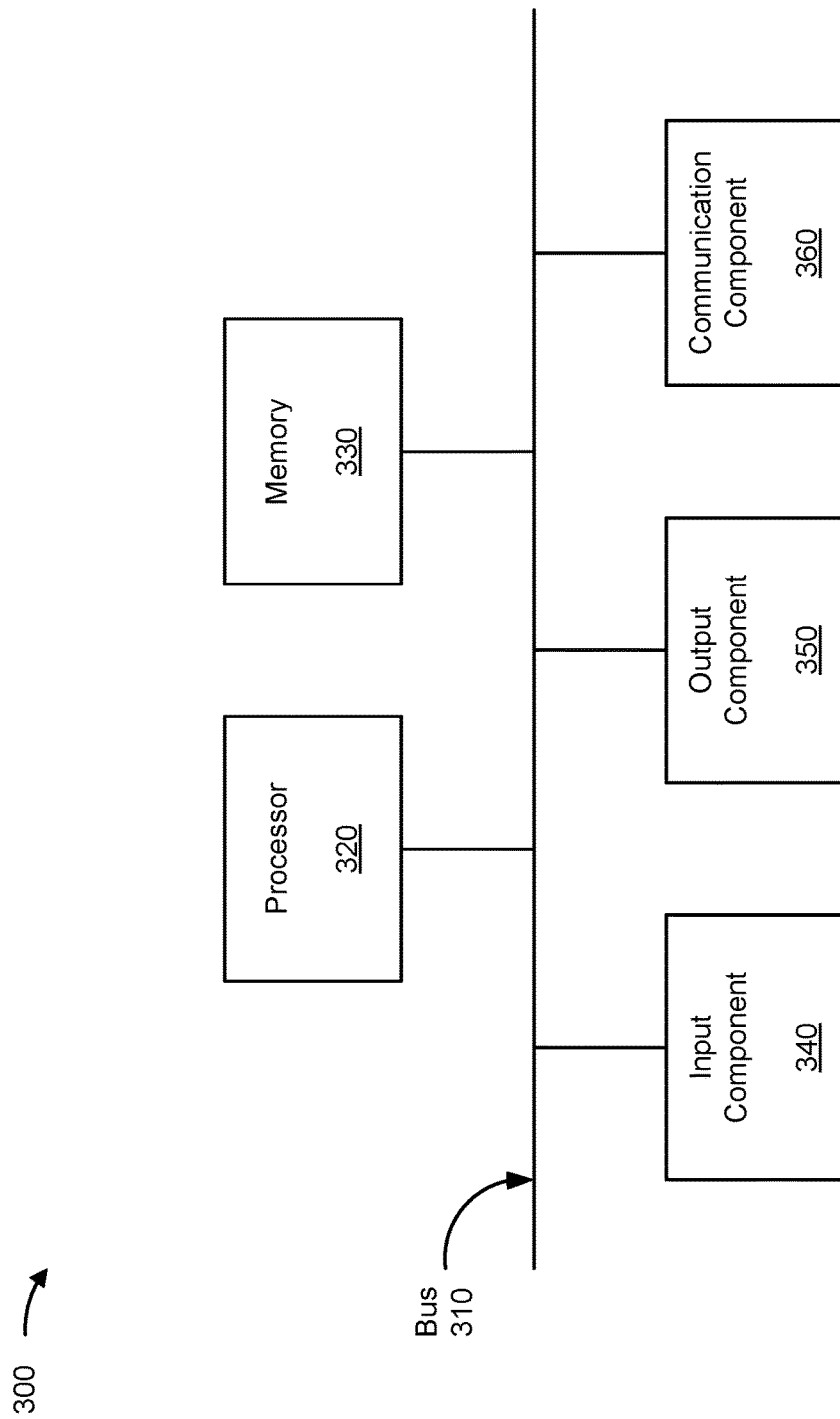
FIGS. 3-4 are diagrams of example components of one or more devices of FIG. 2.

FIG. 3 is a diagram of example components of a device 300, which may correspond to network device 210, server device 230, and/or client device 240. In some implementations, network device 210, server device 230, and/or client device 240 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
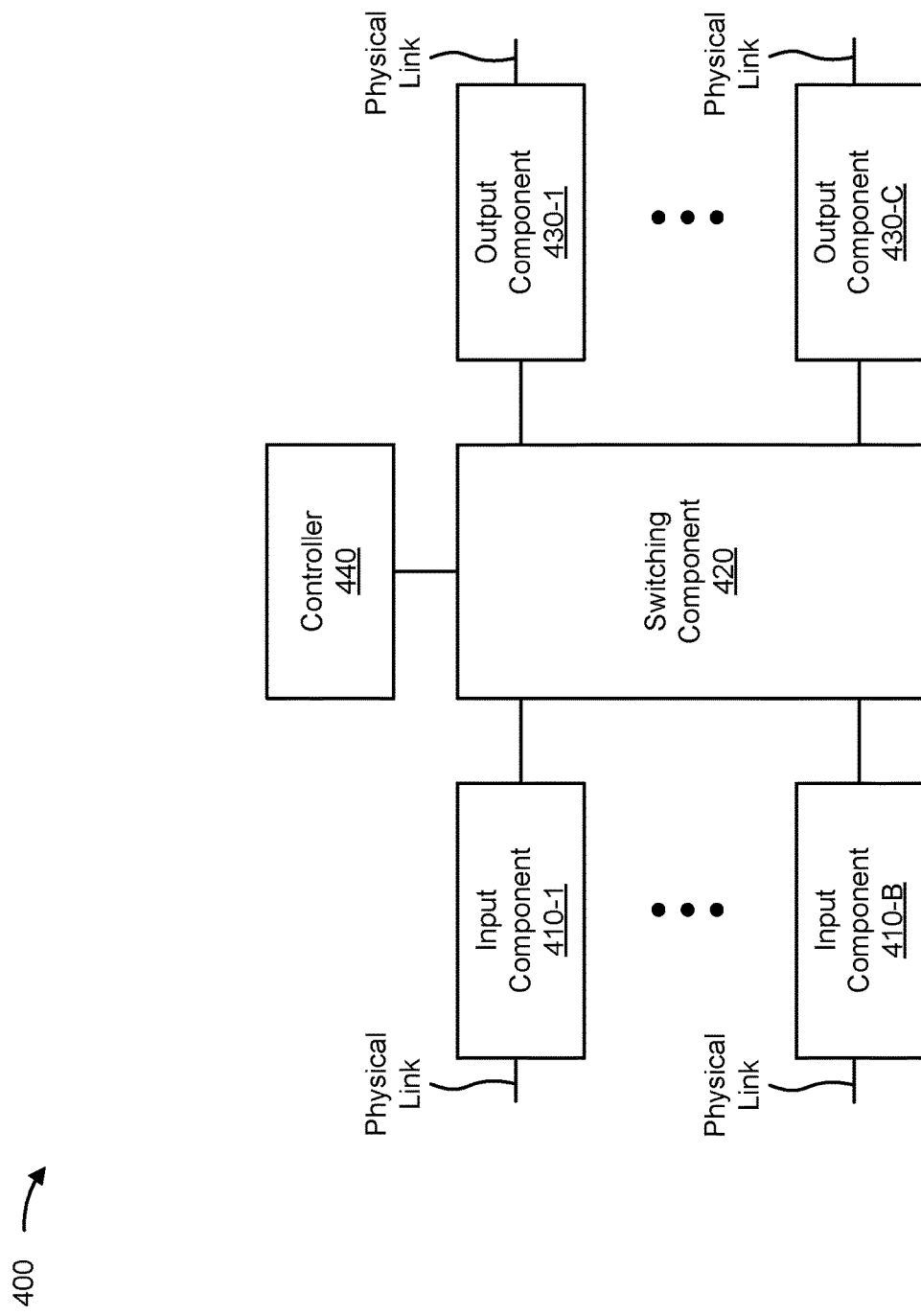

FIG. 4 is a diagram of example components of a device 400. Device 400 may correspond to network device 210, server device 230, and/or client device 240. In some implementations, network device 210, server device 230, and/or client device 240 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C(C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software.

In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
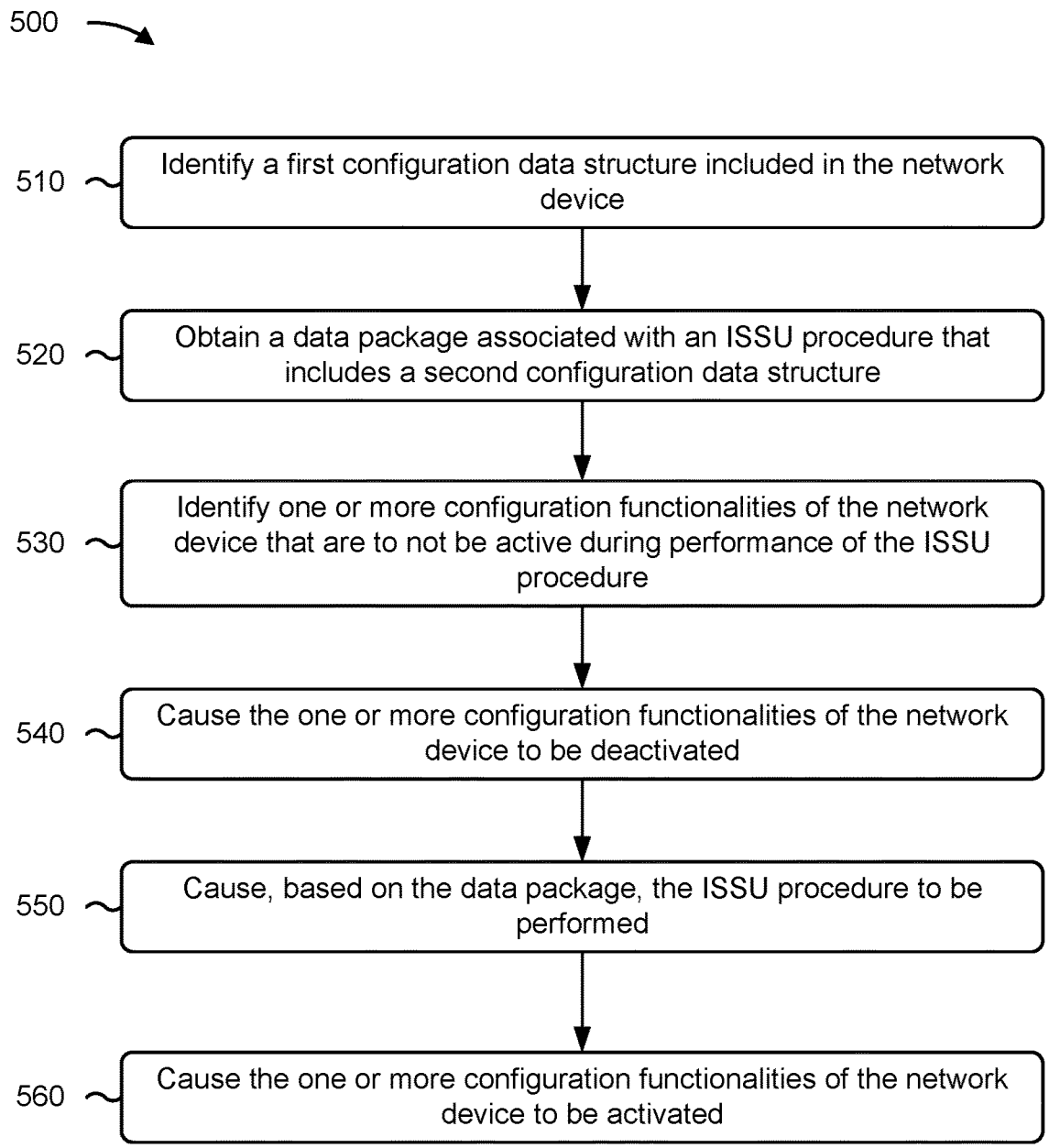
FIG. 5 is a flowchart of example processes relating to automatic deactivation and activation of configuration functionalities of a network device that are incompatible with performance of an IS SU procedure.

FIG. 5 is a flowchart of an example process 500 associated with automatic deactivation and activation of configuration functionalities of a network device that are incompatible with performance of an in-service software upgrade procedure. In some implementations, one or more process blocks of FIG. 5 are performed by the network device (e.g., network device 210). In some implementations, one or more process blocks of FIG. 5 are performed by another device or a group of devices separate from or including the network device, such as a server device (e.g., server device 230) and/or a client device (e.g., client device 240). Additionally, or alternatively, one or more process blocks of FIG. 5 may be performed by one or more components of device 300, such as processor 320, memory 330, input component 340, output component 350, and/or communication component 360; one or more components of device 400, such as input component 410-1, switching component 420, output component 430, and/or controller 440; and/or one or more components of another device.

As shown in FIG. 5, process 500 may include identifying a first configuration data structure included in the network device (block 510). For example, the network device may identify a first configuration data structure included in the network device, as described above.

As further shown in FIG. 5, process 500 may include obtaining a data package associated with an ISSU procedure that includes a second configuration data structure (block 520). For example, the network device may obtain a data package associated with an ISSU procedure that includes a second configuration data structure, as described above.

As further shown in FIG. 5, process 500 may include identifying one or more configuration functionalities of the network device that are to not be active during performance of the ISSU procedure (block 530). For example, the network device may identify, based on at least one of the first configuration data structure or the second configuration data structure, one or more configuration functionalities of the network device that are to not be active during performance of the ISSU procedure, as described above.

As further shown in FIG. 5, process 500 may include causing the one or more configuration functionalities of the network device to be deactivated (block 540). For example, the network device may cause the one or more configuration functionalities of the network device to be deactivated, as described above.

As further shown in FIG. 5, process 500 may include causing, based on the data package, the ISSU procedure to be performed (block 550). For example, the network device may cause, after causing the one or more configuration functionalities of the network device to be deactivated and based on the data package, the ISSU procedure to be performed, as described above.

As further shown in FIG. 5, process 500 may include causing the one or more configuration functionalities of the network device to be activated (block 560). For example, the network device may cause, after causing the ISSU procedure to be performed, the one or more configuration functionalities of the network device to be activated, as described above.

Process 500 may include additional implementations, such as any single implementation or any combination of implementations described below and/or in connection with one or more other processes described elsewhere herein.

In a first implementation, obtaining the data package includes receiving, from a client device, a command indicating that the network device is to be updated via performance of the ISSU procedure, sending, to a server device and based on the command, a request for the data package, and receiving, based on sending the request, the data package.

In a second implementation, alone or in combination with the first implementation, the command indicates that the network device has permission to deactivate and activate configuration functionalities of the network device to facilitate performance of the ISSU procedure.

In a third implementation, alone or in combination with one or more of the first and second implementations, identifying the one or more configuration functionalities of the network device that are to not be active during performance of the ISSU procedure includes processing the first configuration data structure and the second configuration data structure to identify one or more data structure elements, wherein each data structure element, of the one or more data structure elements, identifies a configuration functionality of the one or more configuration functionalities of the network device, wherein the data structure element indicates that the configuration functionality is not compatible with the ISSU procedure, and the data structure element indicates that the configuration functionality is to not be active during performance of the ISSU procedure; and processing the one or more data structure elements to identify the one or more configuration functionalities of the network device.

In a fourth implementation, alone or in combination with one or more of the first through third implementations, process 500 includes storing information identifying the one or more configuration functionalities of the network device in another data structure, and causing, based on the information stored in the other data structure, one or more deactivation actions associated with the one or more configuration functionalities of the network device to be performed.

In a fifth implementation, alone or in combination with one or more of the first through fourth implementations, process 500 includes causing, based on the information stored in the other data structure, one or more activation actions associated with the one or more configuration functionalities of the network device to be performed.

In a sixth implementation, alone or in combination with one or more of the first through fifth implementations, causing the ISSU procedure to be performed is to cause one or more parameters of at least one other configuration functionality of the network device to be modified.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network device, comprising:
one or more memories; and
one or more processors to:
identify a first configuration data structure included in the network device;
obtain a data package associated with an in-service software upgrade (ISSU) procedure that includes a second configuration data structure;
identify, based on the first configuration data structure and the second configuration data structure, one or more configuration functionalities of the network device that are to not be active during a performance of the IS SU procedure,
wherein the performance of the IS SU procedure while the one or more configuration functionalities are active on the network device impacts a performance of the one or more configuration functionalities after the performance of the ISSU procedure;
cause the one or more configuration functionalities of the network device to be deactivated,
wherein deactivating the one or more configuration functionalities of the network device during the performance of the IS SU procedure prevents the performance of the ISSU procedure from negatively impacting the performance of the one or more configuration functionalities after the performance of the ISSU procedure;
cause, after causing the one or more configuration functionalities of the network device to be deactivated and based on the data package, the IS SU procedure to be performed; and
cause, after causing the ISSU procedure to be performed, the one or more configuration functionalities of the network device to be activated.

2. The network device of claim 1, wherein the one or more processors, to obtain the data package, are to:
receive, from a client device, a command indicating that the network device is to be updated via performance of the IS SU procedure;

send, to a server device and based on the command, a
   request for the data package; and
receive, based on sending the request, the data package.

3. The network device of claim 2, wherein the command indicates that the network device has permission to deactivate and activate configuration functionalities of the network device to facilitate performance of the IS SU procedure.

4. The network device of claim 1, wherein the one or more processors, to identify the one or more configuration functionalities of the network device that are to not be active during performance of the IS SU procedure, are to:
   process the first configuration data structure and the second configuration data structure to identify one or more data structure elements,
      wherein each data structure element, of the one or more data structure elements, identifies a configuration functionality of the one or more configuration functionalities of the network device,
         wherein the data structure element indicates that the configuration functionality is not compatible with the ISSU procedure, and
         wherein the data structure element indicates that the configuration functionality is to not be active during performance of the IS SU procedure; and
   process the one or more data structure elements to identify the one or more configuration functionalities of the network device.

5. The network device of claim 1, wherein the one or more processors, to cause the one or more configuration functionalities of the network device to be deactivated, are to:
   store information identifying the one or more configuration functionalities of the network device in another data structure; and
   cause, based on the information stored in the other data structure, one or more deactivation actions associated with the one or more configuration functionalities of the network device to be performed.

6. The network device of claim 5, wherein the one or more processors, to cause the one or more configuration functionalities of the network device to be activated, are to:
   cause, based on the information stored in the other data structure, one or more activation actions associated with the one or more configuration functionalities of the network device to be performed.

7. The network device of claim 1, wherein causing the ISSU procedure to be performed is to cause one or more parameters of at least one other configuration functionality of the network device to be modified.

8. A non-transitory computer-readable medium storing a set of instructions, the set of instructions comprising:
   one or more instructions that, when executed by one or more processors of a network device, cause the network device to:
      obtain a data package associated with an in-service software upgrade (ISSU) procedure;
      identify, based on obtaining the data package, one or more configuration functionalities of the network device that are to not be active during a performance of the ISSU procedure,
         wherein the performance of the IS SU procedure while the one or more configuration functionalities are active on the network device impacts a performance of the one or more configuration functionalities after the performance of the ISSU procedure;
      cause the one or more configuration functionalities of the network device to be deactivated,
         wherein deactivating the one or more configuration functionalities of the network device during the performance of the IS SU procedure prevents the performance of the ISSU procedure from negatively impacting the performance of the one or more configuration functionalities after the performance of the ISSU procedure; and
      cause, after causing the one or more configuration functionalities of the network device to be deactivated and based on the data package, the IS SU procedure to be performed.

9. The non-transitory computer-readable medium of claim 8, wherein the one or more instructions, that cause the network device to obtain the data package, cause the network device to:
   receive, from a client device, a command indicating that the network device is to be updated via performance of the IS SU procedure; and
   obtain, from a server device and based on the command, the data package.

10. The non-transitory computer-readable medium of claim 8, wherein the one or more instructions, that cause the network device to identify the one or more configuration functionalities of the network device that are to not be active during performance of the IS SU procedure, cause the network device to:
   process at least one of a first configuration data structure included in the network device or a second configuration data structure included in the data package to identify one or more data structure elements,
      wherein each data structure element, of the one or more data structure elements, identifies a configuration functionality, of the one or more configuration functionalities of the network device, that is to not be active during performance of the ISSU procedure; and
   process the one or more data structure elements to identify the one or more configuration functionalities of the network device.

11. The non-transitory computer-readable medium of claim 8, wherein the one or more instructions, that cause the network device to cause the one or more configuration functionalities of the network device to be deactivated, cause the network device to:
   cause one or more deactivation actions associated with the one or more configuration functionalities of the network device to be performed.

12. The non-transitory computer-readable medium of claim 8, wherein the one or more instructions, when executed by the one or more processors, further cause the network device to:
   cause, after causing the ISSU procedure to be performed, the one or more configuration functionalities of the network device to be activated.

13. The non-transitory computer-readable medium of claim 12, wherein the one or more instructions, that cause the network device to cause the one or more configuration functionalities of the network device to be activated, cause the network device to:
   cause one or more activation actions associated with the one or more configuration functionalities of the network device to be performed.

14. The non-transitory computer-readable medium of claim 8, wherein causing the IS SU procedure to be performed is to cause one or more parameters of at least one other configuration functionality of the network device to be modified.

15. A method, comprising:
  identifying, by a network device, one or more configuration functionalities of the network device that are to not be active during a performance of an in-service software upgrade (ISSU) procedure,
    wherein the performance of the ISSU procedure while the one or more configuration functionalities are active on the network device impacts a performance of the one or more configuration functionalities after the performance of the ISSU procedure;
  causing, by the network device, the one or more configuration functionalities of the network device to be deactivated,
    wherein deactivating the one or more configuration functionalities of the network device during the performance of the ISSU procedure prevents the performance of the ISSU procedure from negatively impacting the performance of the one or more configuration functionalities after the performance of the ISSU procedure; and
  causing, by the network device and after causing the one or more configuration functionalities of the network device to be deactivated, the ISSU procedure to be performed.

16. The method of claim 15, further comprising:
  obtaining a data package associated with the ISSU, wherein the network device causes the ISSU procedure to be performed based on the data package.

17. The method of claim 16, wherein the network device includes a first configuration data structure and the data package includes a second configuration data structure, wherein at least one of the first configuration data structure or the second configuration data structure indicates, for a particular configuration functionality of the one or more configuration functionalities of the network device, that the particular configuration functionality is to not be active during performance of the ISSU procedure.

18. The method of claim 15, wherein causing the one or more configuration functionalities of the network device to be deactivated comprises:
  causing one or more deactivation actions associated with the one or more configuration functionalities of the network device to be performed.

19. The method of claim 15, further comprising:
  causing, after causing execution of the ISSU procedure, the one or more configuration functionalities of the network device to be activated.

20. The method of claim 19, wherein causing the one or more configuration functionalities of the network device to be activated comprises:
  causing one or more activation actions associated with the one or more configuration functionalities of the network device to be performed.

* * * * *